United States Patent [19]
Suzuki et al.

[11] Patent Number: 6,080,256
[45] Date of Patent: Jun. 27, 2000

[54] TIRE BUILDING APPARATUS AND METHOD

[75] Inventors: Kazuya Suzuki; Toru Nishikawa, both of Shirakawa; Shinobu Suzuki, Tanakura-machi, all of Japan

[73] Assignee: Sumitomo Rubber Industries Limited, Hyogo-Ken, Japan

[21] Appl. No.: 09/034,319

[22] Filed: Mar. 4, 1998

[30] Foreign Application Priority Data

Mar. 4, 1997 [JP] Japan .................................. 9-049318
May 28, 1997 [JP] Japan .................................. 9-138376

[51] Int. Cl.$^7$ .................................................. B29D 30/26
[52] U.S. Cl. ...................... 156/110.1; 156/130; 156/414; 156/417
[58] Field of Search ..................... 156/414–420, 156/406.2, 421.6, 126, 110.1, 127, 130, 123, 133, 285; 249/175, 178, 184

[56] References Cited

U.S. PATENT DOCUMENTS

| | | | |
|---|---|---|---|
| 4,090,909 | 5/1978 | Christie | 156/414 |
| 4,468,267 | 8/1984 | Irie | 156/133 |
| 4,923,554 | 5/1990 | Ozawa | 156/417 |
| 4,959,109 | 9/1990 | Swain et al. | 156/414 |
| 5,500,074 | 3/1996 | Suzuki | 156/406.2 |

OTHER PUBLICATIONS

English language abstract for JP 06–182,901, Jul. 1994.
English language abstract for JP 07–164,555, Jun. 1995.
English language abstract for JP 03–019,831, Jan. 1991.

*Primary Examiner*—Geoffrey L. Knable
*Attorney, Agent, or Firm*—Birch, Stewart, Kolasch & Birch, LLP

[57] ABSTRACT

A tire building apparatus includes a tire building drum for pulling and holding a tire component on the outer circumference thereof. The tire building drum is formed with a plurality of suction portions for pulling the tire component to the tire building drum, and a pitch of a pair of adjacent suction portions in the circumferential direction is set different from a pitch of another pair of adjacent suction portions in the circumferential direction of the tire building drum.

12 Claims, 8 Drawing Sheets

TIRE BUILDING APPARATUS AND METHOD

BACKGROUND OF THE INVENTION AND RELATED ART STATEMENT

This invention relates to a tire building apparatus and a method for pulling and holding a tubular element of a tire component on the circumference of a tire building drum in a green tire production step.

It has been a common procedure in tire building processes in which a tubular tread ring is formed by winding a rubber made belt element and a tread element around a tire building drum, subsequently the tread ring is removed from the tire building drum by a tread ring transferring apparatus and transferred to a tubular carcass-ply which is formed independently and the tread ring is placed around the outer circumference of the carcass-ply to unite them together to form a one piece unit called a green tire.

One example of the tread ring building drum for building the tread ring is shown in FIG. 8. The tread ring building drum is divided into several pieces along the circumferential direction thereof and consists of a plurality of segments 2 that are movable in the radial direction. FIG. 8 shows an expanded state of the segments 2 (an expansion state of the tread ring building drum) 1 and the segments 2 are moved to retracted states, i.e., moving towards a radially inward direction of the tread ring building apparatus, for enabling the removal of the tread ring out of the tread ring building drum 1 with ease.

Each of the segments 2 is provided with an opening 3 which communicates with a negative (vacuum) pressure supply source (suction power source; not shown) and the tread ring material 4 (as one of the tire components) is pulled towards the segments by the suction force generated through the openings 3 to properly maintain the holding state of the tread ring material 4 to the tread ring building drum 1.

In the aforementioned tire building apparatus, the openings 3 are arranged along the circumferential direction of the tread ring building drum 1 at equal pitch P. This equal pitch arrangement of the openings 3 along the circumference of the drum 1 causes some problems regarding the driver's feel of comfort while driving on a tires produced from the apparatus. More specifically, as a result of the equal pitch arrangement of the suction openings 3, it is highly likely that the tread ring form a plurality of strained portions (in the form of indents) 5 along the outer circumference of the tread ring at equal pitch as shown in FIG. 8. It has been known to the person skilled in this art that a tire with strained portions 5 a regular pitch along the outer circumference thereof increases a "RFV (radial force variation)" at its particular variation mode, resulting in degrading the vibration characteristics of the tire as a final product. It in turn adversely affects driving comfort or even produces some abnormal noise. Thus, the formation of strained portions 5 at equal pitch along the outer circumference of the tread ring, due to the equal pitch arrangement of the suction openings 3, adversely affects vibration characteristics of the tire, resulting in driving comfort of the driver being degraded.

Accordingly, there is a need to avoid degradation of the vibration characteristics of the tire without sacrificing the ability of pulling and holding the tread ring material 4 to the tread ring building drum 1.

SUMMARY OF THE INVENTION

It is therefore an object of this invention to solve the problems of the conventional apparatus described in the foregoing section.

It is another object of this invention to provide a tire building method and apparatus which enable avoidance of the degradation of the vibration characteristics of tire without sacrificing the pulling and holding abilities of the tread ring to the tread ring building drum. This allows a comfortable driving space to be maintained.

In order to fulfill the above objects, a tire building apparatus according to the present invention comprises a tire building drum for pulling and holding a tire component. The tire building drum is formed with a plurality of suction portions for pulling the tire component to the tire building drum, and a pitch of one suction portion is set different from a pitch of an adjacent suction portion along the outer circumference of the tire building drum.

With the aforementioned apparatus, strained portions formed along the outer circumference of the tire component, when it is being pulled by the suction portions towards the outer circumference of the tire building drum, can be made at an irregular pitch along the circumferential direction. This irregular arrangement of the strained portions along the circumferential direction of the tread tire positively affects the suppression of RFV buildup at some particular variation mode. This in turn enables a the comfortable driving atmosphere when driving to be maintained. As a result, problems associated with the conventional apparatus—RFV concentrations on some particular variation mode(s), resulting in undesirable vibration characteristics of the tire, leading to the unpleasant driving space—can be solved.

A method of building a tire according to the present invention by the steps of pulling and holding a tire component radially inwardly towards an outer circumference of a tire building drum at a plurality of portions arranged in the circumferential direction is characterized in that a circumferential pitch of an adjacent pair of portions is different from a circumferential pitch of another adjacent pair of portions.

With the aforementioned method, the formation of strained portions along the outer circumference of the tire component, when it is being pulled by the portions towards outer circumference of the tire building drum, can be made at an irregular pitch along the circumferential direction. This irregular arrangement of the strained portions along the circumferential direction of the tread tire positively affects the suppression of RFV buildup at some particular variation mode. This in turn enables comfortable driving atmosphere when driving to be maintained. As a result, problems associated with the conventional apparatus—RFV concentrations on some particular variation mode(s), resulting in undesirable vibration characteristics of the tire, leading to the unpleasant driving space—can be solved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT OF THE INVENTION

Hereinafter an embodiment of this invention will be described with reference to FIGS. 1~7.

Figure 1:
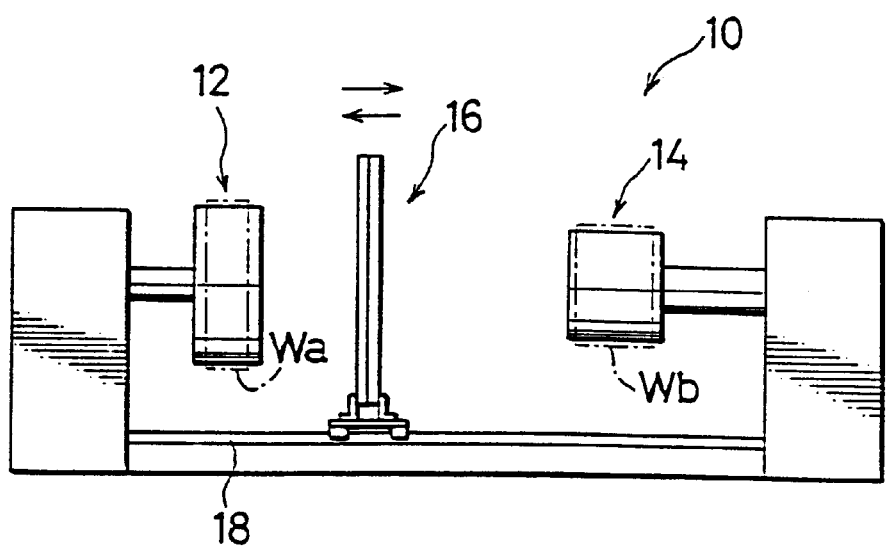
FIG. 1 is a schematic diagram showing a side view of a tire building apparatus of this invention.

Referring to FIG. 1, there is shown a schematic overview of a tire building apparatus 10 embodying the present invention. The tire building apparatus 10 includes a first tire building drum 12 (hereinafter simply referred to as a first drum 12) and a second tire building drum 14 (hereinafter simply referred to as a second drum 14) that are opposingly arranged with a certain distance apart. A tire transfer 16 (hereinafter simply referred to as a transfer 16) is movable along rails 18 between the first and the second tire building drums 12, 14. In the aforementioned construction, a tire building component (hereinafter referred to as a tire component) formed on the first drum 12 is transferred to the second drum 14 to place the tire component over a carcass-ply built on the second drum 14 to form a one piece unit.

More specifically, at the first drum 12, a tubular work Wa (a so-called tread ring) is formed by bonding a belt component and a tread component together. While at the second drum 14, a tubular work Wb is formed by bonding numbers of carcass-plies together. The work Wa is then removed from the first drum 12 by the transfer 16 and is brought to the second drum 14 and placed over the work Wb to form an integral one piece unit, a so-called green tire.

Figure 2:
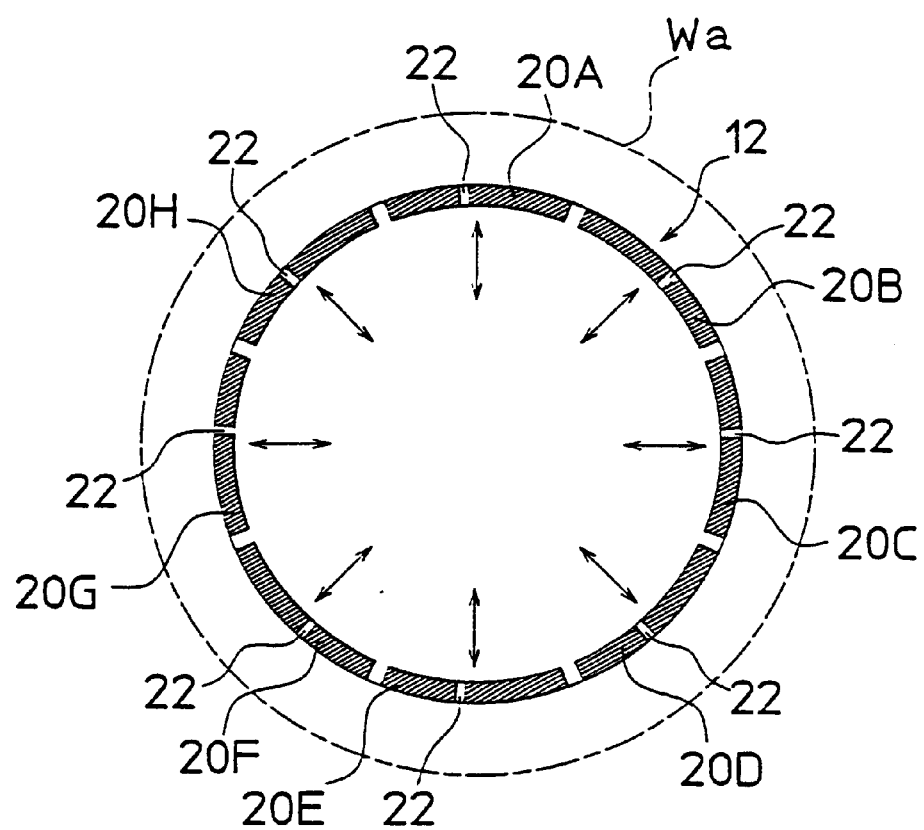
FIG. 2 is a cross-sectional view showing a first tire building drum.

Now, referring to FIG. 2, a structure of the first drum 12 is schematically shown.

The first drum 12 consists of a plurality of identical segments that are arranged at an equal pitch along the circumferential direction of the first drum 12. In this case, eight segments (pieces) 20A~20H are shown.

Though unillustrated, it should be considered that each of the segments 20A~20H is set to move in the radial direction of the first drum 12 (as indicated by the arrow in FIG. 2) with a drive means such as an air cylinder. All the segments are synchronously movable between the radially outermost positions and the radially innermost positions. When the segments are at the radially outermost positions as shown in FIG. 2, the first drum 12 is at an expanded state and when the segments are at the radially innermost positions, the first drum 12 is at a retracted state. The first drum 12 is moved to the expanded state when the work Wa is being formed to wind the belt component and the tread component around the drum 12 whereas the drum 12 is moved to the retracted state when the work Wa is to be removed from the first drum 12 to be transferred to the second drum 14.

Each segment 20A~20H is formed with a plurality of suction holes 22, opening towards a radially outward direction. Each suction hole 22 is connected with a negative (vacuum) pressure supply source (unillustrated). Thus, when the first drum 12 is in the expanded state to form the work Wa, a vacuum pressure is generated on the surface of the first drum 12 through these suction holes 22 to pull the work Wa to the outer surface of the first drum 12 and hold the same over the outer surface.

Figure 3:
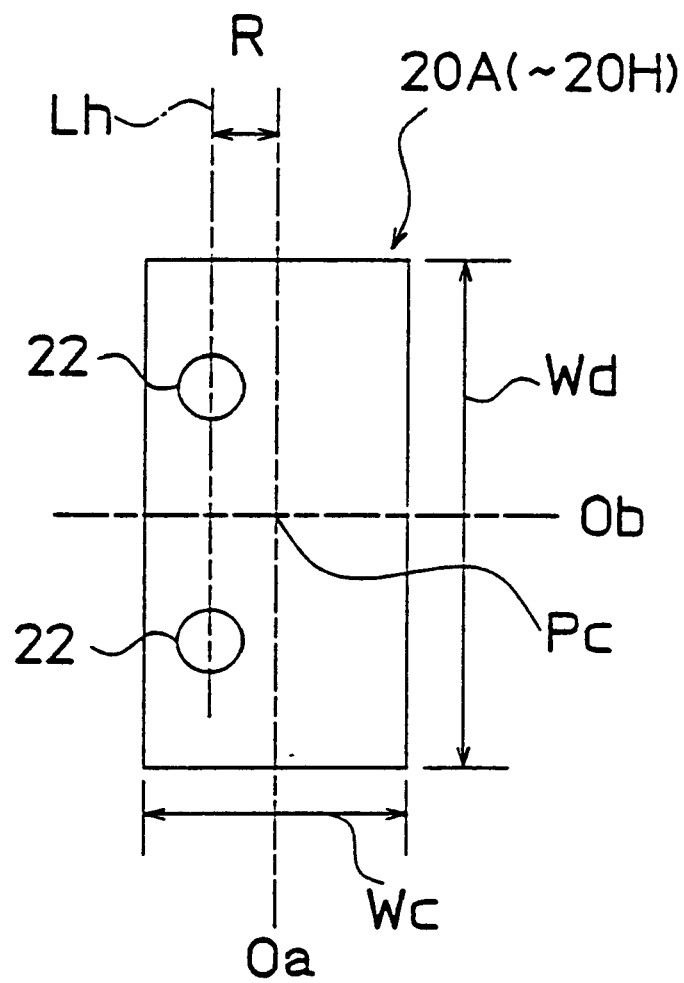
FIG. 3 is a schematic diagram showing an arrangement of segments forming the first tire building drum in a plane.

Referring to FIG. 3, each segment 20A~20H constitutes an equally divided one eighth of the drum 12 and is provided with two circular suction holes 22. All of the eight segments are identical to each other. The arrangement of two suction holes 22 is such that two are aligned on a line $L_h$, extending in the axial direction of the first drum 12, offset from the axially extended center line Oa by an amount R and are equally spaced apart from another center line Ob in the axial direction of the first drum 12. Thus a central point Pc of the segment 20A~20H is defined as an intersection of the circumferential centerline Oa and the axial centerline Ob. At this central point Pc, there is attached the drive means (unillustrated) to move the segment in the radial direction of the first drum 12.

Further, each segment 20A~20H is formed such that when the segment is rotated around the central point Pc by 180 degrees in either direction, the segment is still connectable to the drive means. In other words, one arrangement is as shown in FIG. 3—two holes 22, 22 are on the left side of the circumferential center line Oa and the other arrangement is such that two holes 22, 22 are on the right side of the circumferential center line Oa. Thus whichever arrangement for each segment is chosen, the first drum 12 is operable according to this invention.

Figure 4:
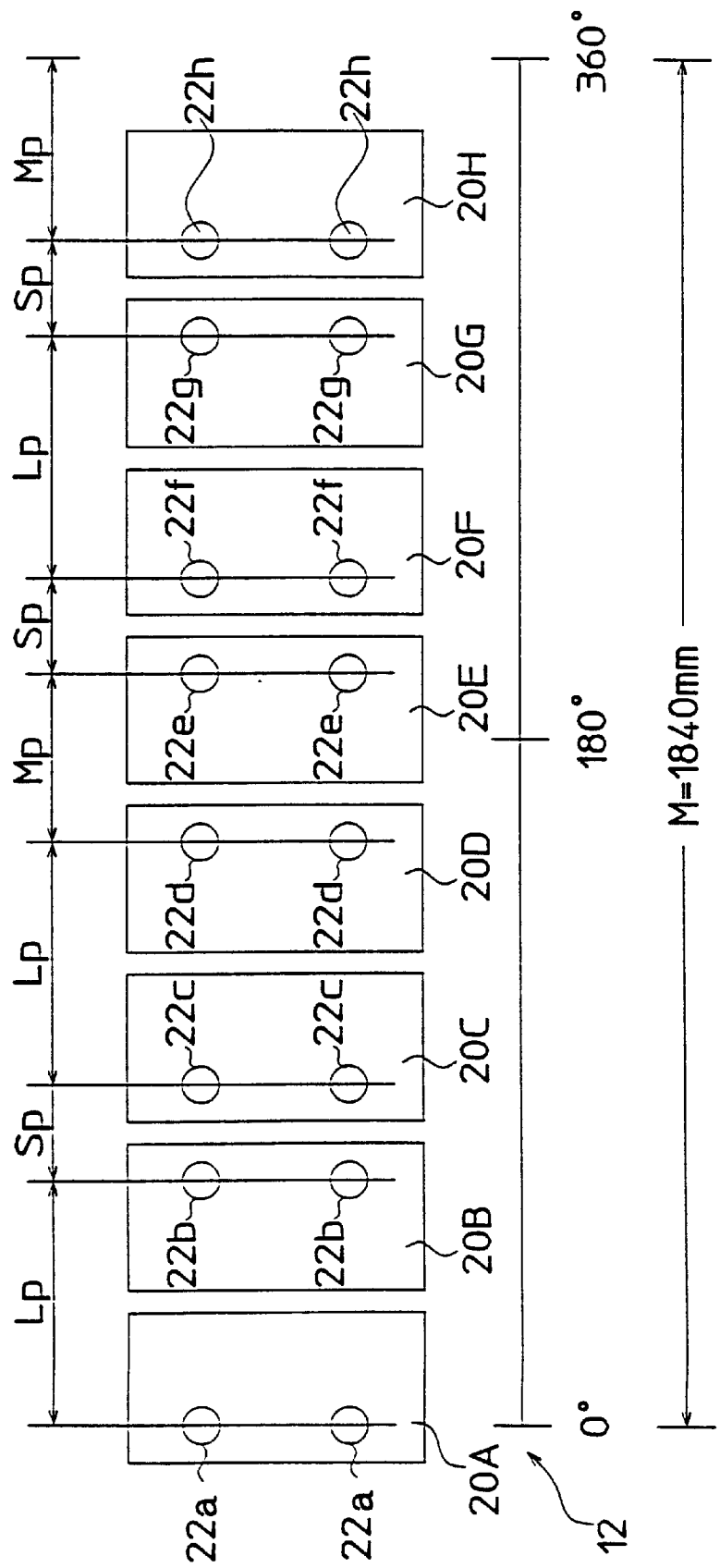
FIG. 4 is a schematically developed diagram (a plan view) showing an arrangement of each segment and its suction portions of the first tire building drum in an expanded state.

Because of the aforementioned nature of the segment 20A~20H, the first drum 12 as a whole can be constructed such that the circumferential pitch of the suction holes 22 is not equal throughout the circumferential direction of the first drum 12. Specifically, in this embodiment, it is possible to produce three different pitches by arranging the orientation of each segment 20A~20H along the circumference of the first drum 12 as shown in FIG. 4—one is a long pitch, Lp, another is a medium pitch, Mp, and the other is a short pitch, Sp. More specifically, the very fact that the holes are offset from the circumferential centerline Oa by 5 degrees ("R=5 degrees" in FIG. 3) in the circumferential direction of the first drum 12 enables a production of the three different pitches; Lp=55 degrees; Mp=45 degrees; and Sp=35 degrees. Further, let us assume a first suction unit consisting of three consecutive three suction holes in the circumferential direction (in a certain direction; in this case a direction from left to right), and a second suction unit consisting of three consecutive three suction holes next to the first suction unit in the certain direction; then we have from the left a first pitch between a first suction hole and a second suction hole; a second pitch between the second suction hole and a third suction hole for the first suction unit and similarly we have corresponding first and second pitches for the second suction unit. Then orientations of each segment 20A~20H along the circumference of the drum 12 of this invention makes either one of the corresponding pair of first pitches of the first and second suction units or corresponding pair of second pitches of the first and the second suction units not identical. Let us illustrate the aforementioned arrangement with FIG. 4, assume the first suction unit consists of three suction holes 22a–22c on segments 20A–20C and the second suction unit consists of three suction holes 22c–22e on segments 20C–20E, then the segments are so arranged that at least one of the following conditions is satisfied:

(a) a first pitch "Lp" of the first suction unit (22a–22c) is different from a first pitch "Lp" of the second suction unit (22c–22e); or (b) a second pitch "Sp" of the first suction unit (22a–22c) is different from a second pitch "Mp" of the second suction unit (22c–22e).

In this instant case, the above (b) is satisfied.

Because of the aforementioned arrangement of the segments, strains (in the form of recessed deformation: called suction strain) formed on the work during the suction step in the tread ring building process become irregular in pitch in the circumferential direction of the tread ring. As a result, RFV components due to the strained portions of the work Wa (a so-called suction strain) are well dispersed over the lower to higher variation modes, avoiding the concentration of the RFV buildup at some particular variation mode. Hence it becomes possible to suppress the rise of RFV at a particular variation mode and in turn effectively lowers the possibility of degradation of the vibration characteristics.

Experimental data:

The following table shows a measurement result of RFV of a tire (195/65R15) produced by the conventional tire building apparatus and the apparatus 10 of the present invention in accordance with the measurement method defined in JASO-C607. The results are an average value of 20 samples for each apparatus. Where a circumference M of the first drum 12 is 1840 mm; a circumferential width Wc of each segment 20A~20H is 200 mm; and an axial width Wd of each segment 20A~20H is 300 mm.

TABLE 1

| | 0A | 1H | 2H | 3H | 4H | 5H | 6H | 7H | 8H | 9H | 10H |
|---|---|---|---|---|---|---|---|---|---|---|---|
| Conventional Type | 6.0 | 2.3 | 2.5 | 1.3 | 1.4 | 0.7 | 0.5 | 0.6 | 0.7 | 0.3 | 0.2 |
| Invention | 6.1 | 3.8 | 2.1 | 0.9 | 0.7 | 0.6 | 0.3 | 0.3 | 0.3 | 0.2 | 0.1 | where "OA"–"10H" in the top line denote the first to tenth variation modes and "OA" denotes the overall variation.

Figure 5:
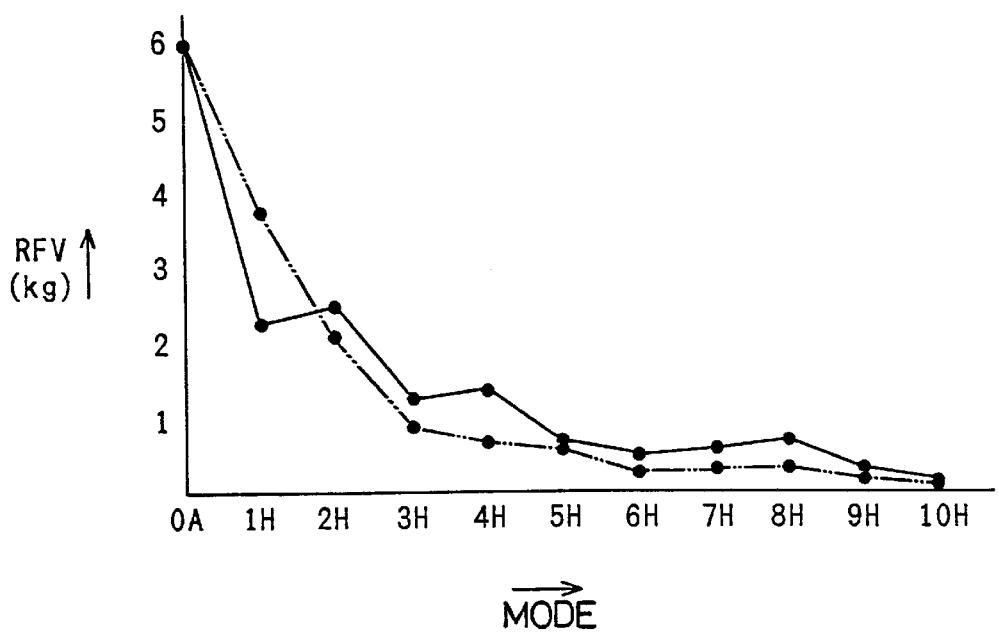
FIG. 5 is a graph showing a measurement result of RFV.

FIG. 5 is a graphical illustration of the measurement results. A solid line indicates a measurement result of the tire with the use of the conventional apparatus and a phantom line indicates a measurement result of the tire with the apparatus 10 of the present invention.

As can be observed in FIG. 5, RFV components at respective variation modes of the tire produced by the tire building apparatus 10 of the present invention are generally lower than those corresponding RFV components of tires produced by the conventional apparatus. This comparison result clearly illustrates the effectiveness of the arrangement of the suction holes 22 of the tire building apparatus 10 of the present invention with respect to dispersion of the RFV due to the suction strain over ranges of frequencies.

As a result, in the tire building apparatus 10 with aforementioned arrangement—suction holes 22 are arranged on the first drum 12 at irregular pitch—, it is made possible to disperse RFV due to the suction stain over ranges of variation modes, avoiding the degradation of the vibration characteristics and resulting in a comfortable driving atmosphere being maintained without sacrificing the holding performance of the work Wa over the drum surface.

Further, in the aforementioned tire building apparatus 10, all of the segments 20A~20H are identical to each other, keeping the drum structure simple. Accordingly, the design, machining (production), part administration, maintenance of the drum and its associated parts are not made difficult because of the aforementioned arrangement.

Hereinafter, another embodiment of the present invention is described with reference to FIG. 6. As clearly shown in this figure, in place of the aforementioned segment 20A (~20H), another form of segment 20A' (~20H') is used.

Figure 6:
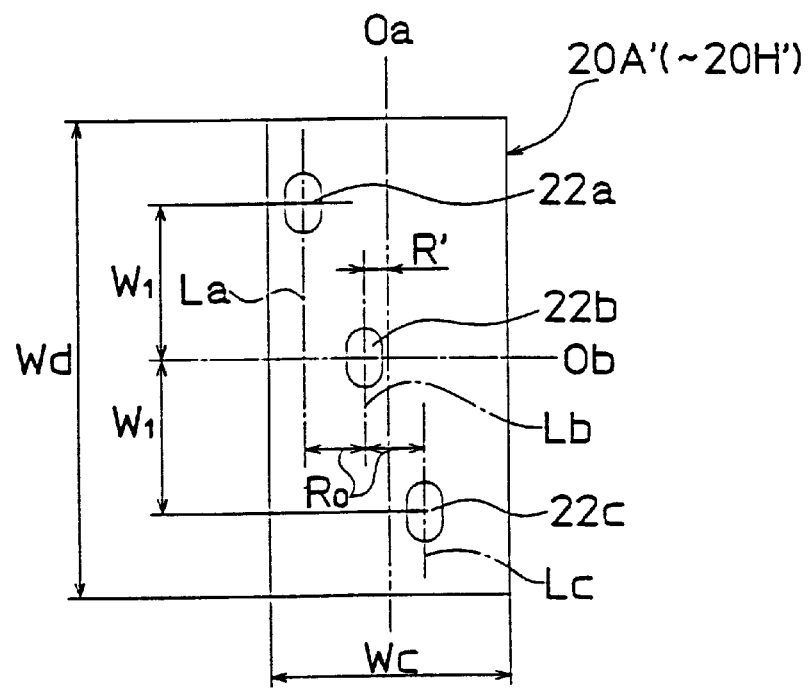
FIG. 6 is a schematic diagram showing an alternate form of the segments forming the first tire building drum.

This segment 20A' (~20H') shown in FIG. 6 has three oval shaped suction holes 22a~22c. These oval holes 22a–22c are arranged on the three axially extending lines La–Lc that are spaced apart from each other by an amount Ro in the circumferential direction (Wc direction). Also, the three oval holes 22a–22c are offset from each other in the axial direction (Wd-direction); the middle oval hole 22b is on the center line Ob and the top oval hole 22a and the lower oval hole 22c are apart from the middle oval hole 22b by an equal distance "w1" in the axial direction (Wd-direction). Note that the term "top" or "bottom" are used to indicate the arrangement of holes along with FIG. 6 only; those terms do not survive when viewing the actual apparatus. Further, the middle oval hole 22b is offset from the centerline Oa to the left side (in this figure) by an amount R'. In other words, the oval suction holes 22a–22c are aligned on a line extending through the three centers of the oval holes 22a–22c. Note that the line Ob is a centerline of the segment 20A' in the Wd direction and the line Oa is a centerline of the segment 20A' in the circumferential direction. It should be noted that strictly speaking the amount indicated by Ro and R' notions are arc length (angle in radians×radius of the drum). Thus these amounts can also be indicated in dimension of angles, i.e., degrees or radians.

As in the aforementioned type segment with two holes, the segment 20A' (~20H') can be attached to the drive means in different orientations. Specifically, one orientation of the segment 20A' is such that the middle suction hole 22b is offset from the center line Oa to the left when viewing from one side of the drum in the axial direction thereof and the other orientation of the segment 20A' is such that the middle suction hole 22b is offset from the center line Oa to the right when viewing from the same side of the drum in the axial direction thereof. The segment 20A' in either one of the above mentioned orientations can be attached to the drive means. By changing its orientation among the segments 20A'–20H', the irregular pitch arrangement of the oval suction holes in the circumferential direction can be realized.

Figure 7:
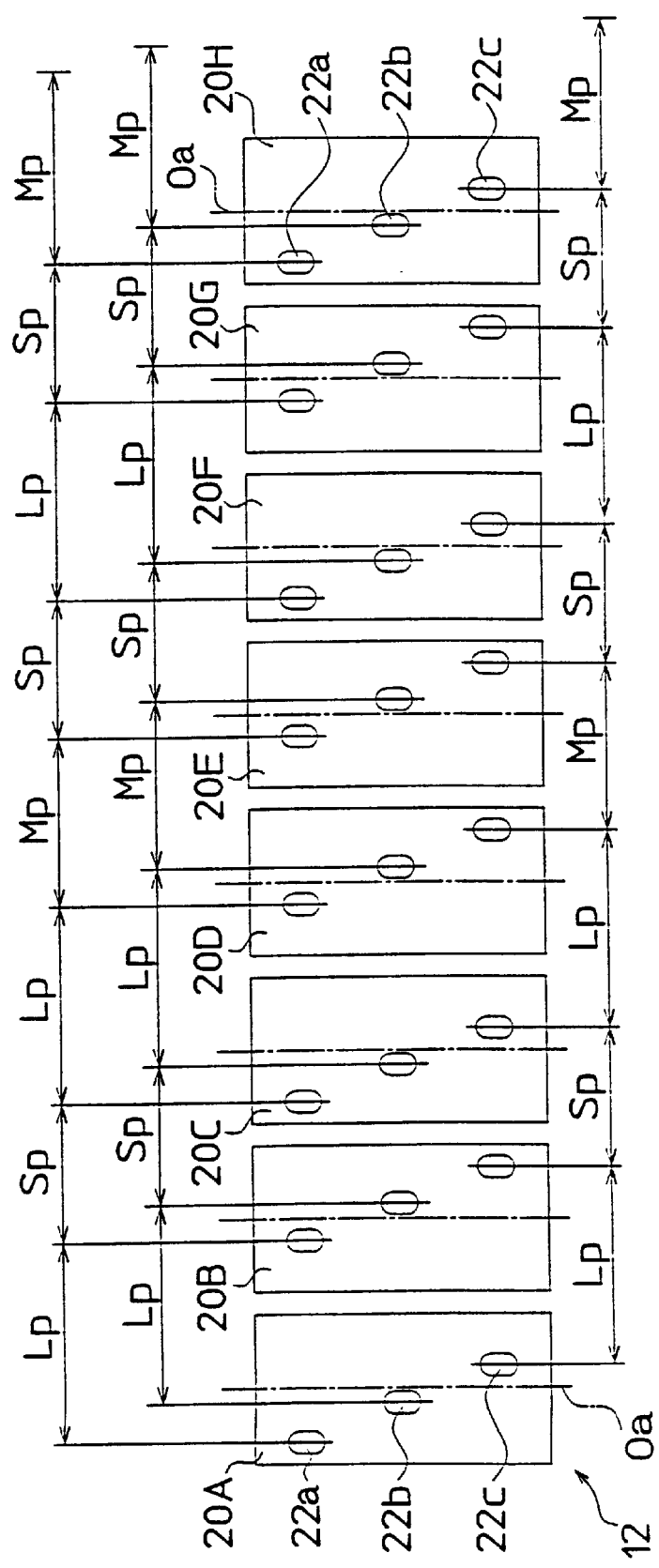
FIG. 7 is a schematically developed diagram (a plan view) showing an arrangement of each segment and its suction portions (corresponding to FIG. 6) of the first tire building drum in an expanded state.
Figure 8:
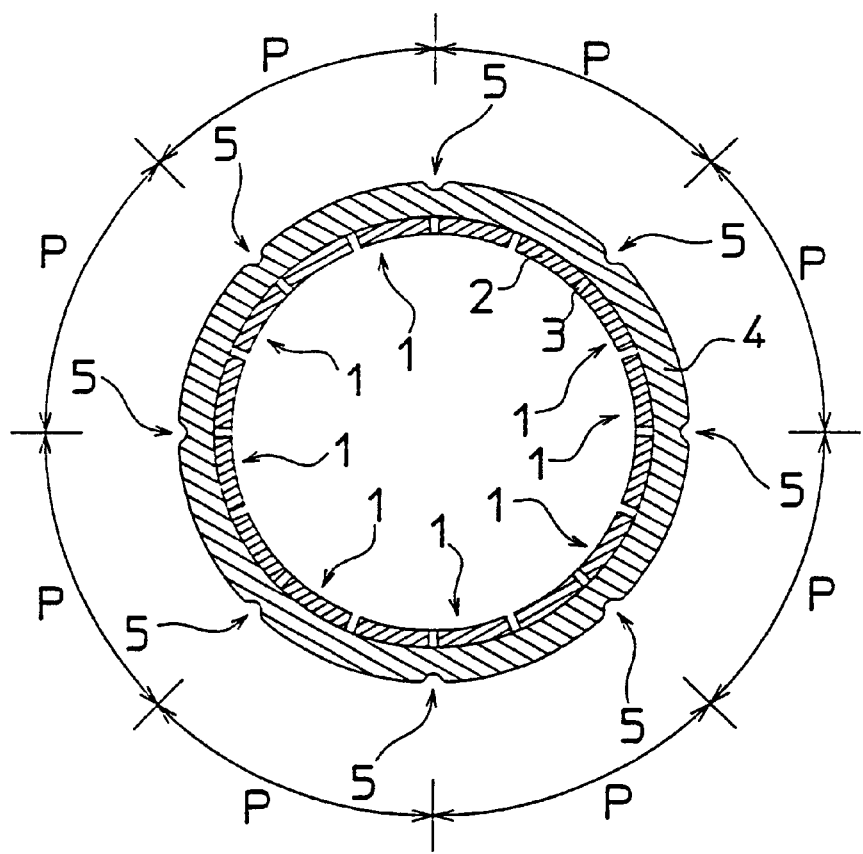
FIG. 8 is a cross-sectional view showing a conventional tire building drum for use in a tire building apparatus.

One example of such irregular pitch arrangement applied to the first drum 12 is shown in FIG. 7. In this arrangement, the top suction holes 22a of segments 20A'–20H' are arranged such that the circumferential pitch between the adjacent holes are of three kinds, namely a long pitch noted by Lp, a medium pitch noted by Mp, and a short pitch noted by Sp. In the same way, the middle suction holes 22b of segments 20A'–20H' are arranged such that the circumeferential pitch between the adjacent holes are of three kinds, namely Lp, Mp, and Sp. The same is true for the bottom holes 22c of segments 22A'–22H'. In this embodiment, let us assign 5 degrees and 11.25 degrees to R' and Ro (see FIG. 6) respectively, then the pitches Lp, Mp, and Sp are 55 degrees, 45 degrees, and 35 degrees respectively. This is the same as the values of previous embodiment.

Accordingly, with the tire building drum formed by these segments 20A'–20H', it is possible to avoid the adverse effects of the vibration characteristics due to the suction performance of the work Wa by the suction holes and secure a comfortable atmosphere while driving.

It should be noted, however, the first drum 12 described in the above passages is an example of an application of the present invention, the detailed structure thereof was intentionally omitted. Therefore, it should be considered within the scope of the invention, if the particular feature of the tire building apparatus has an aforementioned features regardless of the other detailed features of the tire building apparatus.

The embodiment along with FIG. 3 has a segment 20A (~20H) with suction holes 22 offset from the center line Oa by 5 degrees in the circumferential direction and the embodiment along with FIG. 6 has a segment 20A' (~20H') with a middle suction hole 22 offset from the center line Oa by 5 degrees in the circumferential direction; however, these offset amounts R and R' are not limited to 5 degrees. Nevertheless, the offset amount R (R') should be set more than three degrees and preferably more than five degrees. In other words, when the offset amount, say R, is set to less than three degrees, distribution of the suction strains are likely limited, resulting in poor performance in suppression of RFV buildup at some particular variation modes.

Further, the aforementioned first drum 12 is formed with a plurality of identical segments 20A–20H and the orientations of the segments in the circumferential direction are carefully engineered to produce a desired irregular pitch arrangement of the suction holes 22. However, it is possible that varying the offset amount R in FIG. 3 to three kinds— having three different kinds of segments—will obtain the desired irregular pitch arrangement of the suction holes in the circumferential direction. However, the obvious drawback—having three kinds of segments—is to be accompanied with this arrangement. Further, having more than three kinds of segments having a different Ro value (in FIG. 3) is still possible to attain the same result of the present invention.

Moreover, the number of segments, the shape of each segment, the number of suction holes per segment, an offset amount R and an offset amount R' are considered to be a design choice of those skilled in this art; therefore, this invention is no way limited to the numbers or quantities described in the aforementioned paragraphs. The important thing is to carefully chose these quantities to effectively suppress RFV over the ranges of variation modes due to the suction strain of the tire in accordance with the respective structure of the tire, the structure of the tire building drum, the desired performance or specifications.

Moreover, the source of suction force is not limited to the aforementioned air suction type, but it could be a magnetic type suction source. In this case, in place of the air suction holes as described in the above embodiments, the magnet may be embedded in the segment to pull and hold the work Wa. In fact there exists a type of tire building apparatus with the use of magnetic power to pull and hold the work Wa as the work Wa contains some ferrous material therein. Specifically, the arrangement of magnetic pieces can be set in accordance with the aforementioned arrangements of the suction holes in the segments. Referring to FIG. 3, the suction holes 22 can be replaced with the magnetic pieces. Further, referring to FIG. 6, the suction holes 22 can also be replaced with magnetic pieces to achieve the same objects of this invention.

Although the present invention has been fully described by way of examples with reference to the accompanying drawings, it is understood that various changes and modifications will be apparent to those skilled in the art. Therefore, unless otherwise such changes and modifications depart from the scope of this invention as defined in the following section, they should be constructed as being included therein.

What is claimed is:

1. A method of building a tire comprising the steps of:
providing a plurality of segments which together form an outer surface of a tire building drum, each of said plurality of segments including at least one vacuum or magnetic attraction portion formed thereon;
pulling a tire component radially inwardly towards an outer circumference of the tire building drum at a plurality of portions arranged in the circumferential direction; and
providing a circumferential pitch of adjacent of said at least one portions on a pair of adjacent of said segments different from a circumferential pitch of adjacent of said at least one portions on another pair of adjacent of said segments.

2. The method as defined in claim 1, further comprising the step of arranging the at least one portion on each of the segments in the circumferential direction such that there exists three different pitches among adjacent of the at least one portion on each of the segments in the circumferential direction.

3. The method as defined in claim 1, further comprising the step of arranging the at least one portion on each of the segments in the circumferential direction such that a first vacuum or magnetic attraction set includes three consecutive portions in one circumferential direction and an adjacent second set includes three consecutive portions in the same circumferential direction, and a first circumferential pitch P1 is between a first portion and a second portion of the first set and a second circumferential pitch P2 is between the second portion and a third portion of the first set, and a first circumferential pitch P1' is between a first portion and a second portion of the second set and a second circumferential pitch P2' is between the second portion and a third portion of the second set, then at least one of the following conditions is met:

P1≠P1' or

P2≠P2'.

4. A tire building apparatus comprising:
a tire building drum for pulling and holding a tire component, said tire building drum being formed with a plurality of segments which together form a surface of the tire building drum, each of said plurality of segments including at least one vacuum or magnetic attraction portion for pulling the tire component to the surface of the tire building drum, and
a circumferential pitch between adjacent of said at least one vacuum or magnetic attraction portions on a pair of adjacent of said segments is different from a circumferential pitch between adjacent of said at least one vacuum or magnetic attraction portions on another pair of adjacent of said segments.

5. The tire building apparatus as defined in claim 4, wherein the tire building drum further includes:
a first vacuum or magnetic attraction set having three consecutive vacuum or magnetic attraction portions aligned in a certain circumferential direction of the tire building drum and a first circumferential pitch P1 is between a first vacuum or magnetic attraction portion and a second vacuum or magnetic attraction portion and a second circumferential pitch P2 is between the second vacuum or magnetic attraction portion and a third vacuum or magnetic attraction portion; and
a second vacuum or magnetic attraction set having three consecutive vacuum or magnetic attraction portions in the certain circumferential direction of the tire building drum, a first vacuum or magnetic attraction portion of the second vacuum or magnetic attraction set being the third vacuum or magnetic attraction portion of the first vacuum or magnetic attraction set and a first circumferential pitch P1' is between the first vacuum or magnetic attraction portion and a second vacuum or magnetic attraction portion of the second vacuum or magnetic attraction set and a second circumferential pitch P2' is between the second vacuum or magnetic attraction portion and a third vacuum or magnetic attraction portion of the second vacuum or magnetic attraction set, and wherein at least one of the following relations is met:

P1≠P1' or
P2≠P2'.

6. The tire building apparatus as defined in claim 4, wherein each of the segments is formed with two vacuum or magnetic attraction portions in the form of suction holes.

7. The tire building apparatus as defined in claim 4, wherein each of the segments is formed with said vacuum or magnetic attraction portions being a magnetic piece.

8. The tire building apparatus as defined in claim 6, wherein the two suction holes are aligned along a line extending in an axial direction of the tire building drum.

9. The tire building apparatus as defined in claim 8, wherein the two suction holes are offset from a circumferential centerline of each of the segments in the circumferential direction, respectively.

10. The tire building apparatus as defined in claim 4, wherein each of the segments is formed with three vacuum or magnetic attraction portions in the form of suction holes.

11. The tire building apparatus as defined in claim 10, wherein the three suction holes are aligned on a line extending through each center of the suction holes.

12. The tire building apparatus as defined in claim 11, wherein a middle suction hole is offset from a circumferential centerline of each of the segments in the circumferential direction, respectively.

* * * * *